(12) United States Patent
Teunen et al.

(10) Patent No.: US 7,454,349 B2
(45) Date of Patent: Nov. 18, 2008

(54) VIRTUAL VOICEPRINT SYSTEM AND METHOD FOR GENERATING VOICEPRINTS

(75) Inventors: Remco Teunen, Menlo Park, CA (US); Karen Kaushansky, San Francisco, CA (US)

(73) Assignee: RSA Security Inc., Bedford, MA (US)

( * ) Notice: Subject to any disclaimer, the term of this patent is extended or adjusted under 35 U.S.C. 154(b) by 855 days.

(21) Appl. No.: 10/736,954

(22) Filed: Dec. 15, 2003

(65) Prior Publication Data

US 2005/0131706 A1    Jun. 16, 2005

(51) Int. Cl.
    *G10L 17/00*    (2006.01)
(52) U.S. Cl. ........................................ 704/273
(58) Field of Classification Search ................. 704/273
    See application file for complete search history.

(56) References Cited

U.S. PATENT DOCUMENTS

| 6,434,526 B1* | 8/2002 | Cilurzo et al. | 704/270.1 |
| 6,501,832 B1* | 12/2002 | Saylor et al. | 379/88.04 |
| 6,829,334 B1* | 12/2004 | Zirngibl et al. | 379/88.17 |
| 6,895,084 B1* | 5/2005 | Saylor et al. | 379/88.22 |
| 2002/0065656 A1* | 5/2002 | Reding et al. | 704/244 |
| 2002/0072900 A1* | 6/2002 | Keough et al. | 704/220 |

FOREIGN PATENT DOCUMENTS

| EP | 0817170 | 1/1998 |
| EP | 04813591 | 6/2007 |
| WO | WO9840875 | 9/1998 |

OTHER PUBLICATIONS

Written Opinion of the International Searching Authority, Aug. 23, 2006, 3 pages.
International Search Report, Aug. 23, 2006, 4 pages.

* cited by examiner

*Primary Examiner*—Susan McFadden

(57) ABSTRACT

A system and method for generating on-demand voiceprints are presented wherein voiceprints are created on the fly using voice recordings and associated metadata specified by an application. The application requests a voiceprint and specifies a description of the data necessary to generate the voiceprint, including the appropriate voice recordings, the requisite verification engine and other parameters that should be utilized to generate the voiceprint. The specified voice recordings are accessed from storage and a voiceprint is produced using the designated speech engine and application-specified parameters.

13 Claims, 3 Drawing Sheets

Application - Enrollment

VIRTUAL VOICEPRINT SYSTEM AND METHOD FOR GENERATING VOICEPRINTS

BACKGROUND OF THE INVENTION

1. Field of the Invention

The present invention relates generally to the field of speaker authentication, and more particularly to a system and method for generating on-demand voiceprints using voice data descriptions.

2. Background of the Technology

Authentication systems and methods are used in almost every commercial transaction these days. These methods can be as simple as a manual signature verification or photo identification to the more complicated biometric analyses which authenticate an individual using one or more aspects of that individual's biometric characteristics. A prevalent example of such a biometric system in today's commercial environment is a system which uses the characteristics of a persons speech to make an authentication decision (is this person or is this person not who they are claiming to be).

In a typical interactive voice response (IVR) application, a speaker will call into a system to access the system over the phone. The speaker will be asked a number of questions or given a number of options in order to navigate the application. As part of this process, the system will authenticate the speaker by comparing the speaker's real-time speech with a copy of the speaker's voiceprint (a model of the speaker's voice). Traditionally, this voiceprint is constructed in one or more enrollment sessions during which the speaker answers a series of questions. The characteristics of the speaker's speech are then used by the system to build the voiceprint associated with that person. This voiceprint is stored by the system for future use.

This method of creating and storing the voiceprint during an enrollment process for future use is effective, and relatively straightforward to implement. Typically, a byproduct of this process is that the actual voice recordings used to construct the voiceprint are discarded (or not generally available for on-demand use). Though generally effective, this method suffers from a few fundamental drawbacks. In particular, this method, and the systems or applications that rely on it, is not technologically independent. That is, there is no standard format or encoding for voiceprints. This means that each voiceprint that is created by a system or for a particular application is integrally tied to the speech technology ("speech engine") used to create that voiceprint. Indeed, the voiceprint may even be integrally tied to a particular version of the speech engine used to create it. The ultimate result is that a particular voiceprint can not be used with a different speech engine, or perhaps not even with a different version of the same speech engine. This leads to significant difficulty for a system or application provider when switching speech engines, or more importantly, upgrading an existing speech engine. No one wants to go through an enrollment process to create a useable voiceprint with each and every speech engine upgrade.

Another difficulty with current systems is their inability to handle changes in a speaker's voice over time. Although some of the more sophisticated systems attempt to mitigate these changes by adapting their voiceprints with new data, the old data still remains a significant part of the model. A further problem with the current systems and methods is the inability of multiple authentication applications to easily share voiceprints. For example, a first application may require voiceprints that contain utterance "a," "b," and "c,' and a second application may require voiceprints that contain utterance "b," "c," and "d." Even though the underlying speech engine may be the same, a person would have to enroll two times, once for each application. This, or a combination of the above problems, can lead to substantial user frustration.

SUMMARY OF THE INVENTION

A novel solution to the problems associated with the current method of storing and retrieving voiceprints for authentication is to instead store annotated voice recordings, and generate the necessary voiceprints "on-demand" (in real time when requested by a particular system or application). In essence, such a system stores data needed to create voiceprints in the system storage. This data includes actual voice recordings from a specific speaker with associated descriptions relevant to the characteristics of those recordings. When an application requests a voiceprint, the application specifies a description of the data necessary to generate the relevant voiceprint and the requisite verification engine and other parameters that should be utilized to generate the voiceprint. The requested voice data is accessed from storage and the system produces the voiceprint using the designated speech engine and application-specified parameters.

Thus, voiceprints are created on-the-fly when requested by the application. Unlike existing voiceprints, voice recordings can be obtained and stored in a manner that is not specific to any particular verification engine or version of a particular engine. A significant benefit to such a design is that, if an application calls for a particular speech engine, or a particular version of a speech engine, the existing voice recordings can be used to generate the requisite voiceprint. Should the same application call for a different speech engine, or different version of the speech engine, the same existing voice recordings can once again be used to generate the voiceprint. Users are not required to re-enroll (to generate a new voiceprint). Additionally, having the systematic ability to replace old voice recordings with new voice recordings (which may be recorded upon successful authentication), subsequently generated voiceprints remain current and are not polluted by old voice data. This substantially eliminates problems associated with a speaker's voice changing over time. Equally important, these stored voice recordings can easily be shared between multiple and different applications. This eliminates the frustrating redundancy involved when a person otherwise is required to enroll multiple times.

BRIEF DESCRIPTION OF THE DRAWINGS

A better understanding of the present invention can be obtained when the following detailed description of an embodiment is considered in conjunction with the following drawings, in which.

Figure 1:
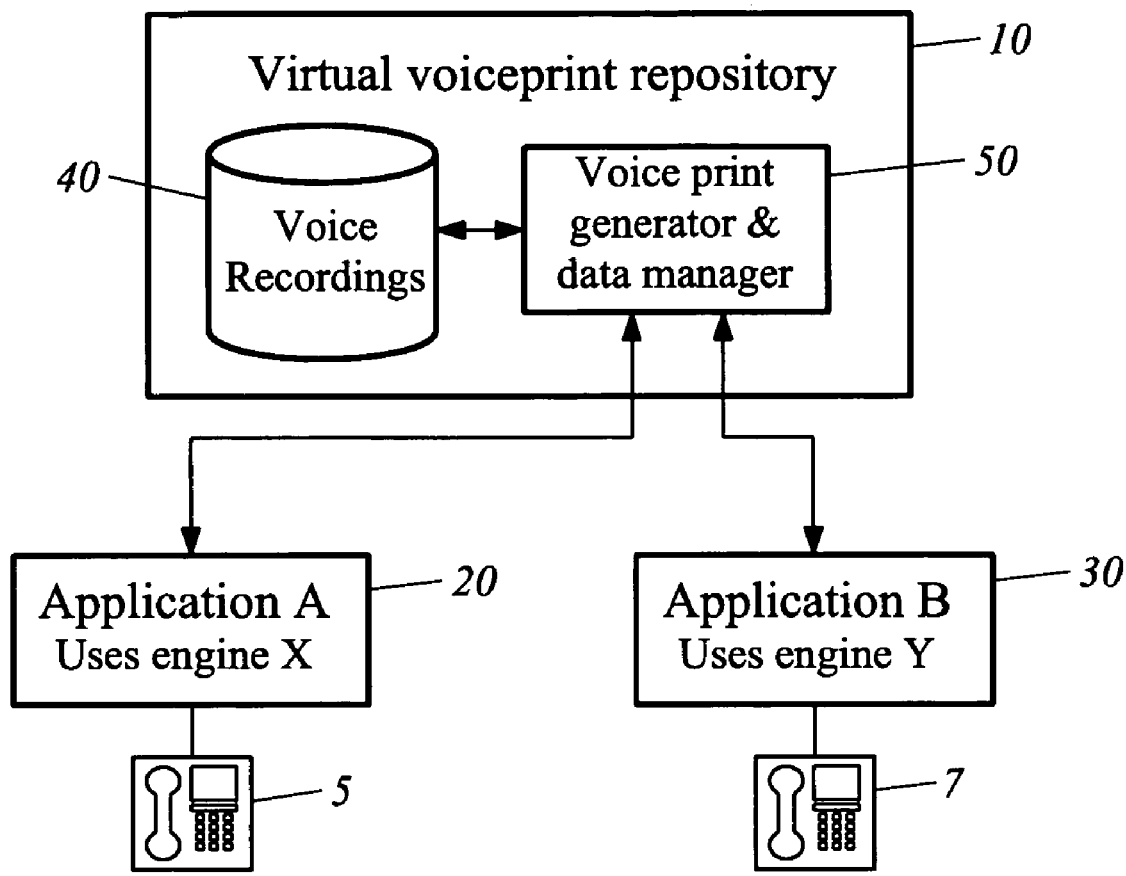
FIG. 1: shows a block diagram of the various interactions between components of an embodiment of the present invention.

While the invention is susceptible to various modifications and alternative forms, specific embodiments are shown, by way of example, in the drawings and will be described in detail herein. It should be understood, however, that the drawings and associated detailed description are not intended to limit the invention to the particular form disclosed. The invention comprises all modifications, equivalents and alternatives within the spirit and scope of the presently described embodiment and as defined by the appended claims.

DETAILED DESCRIPTION OF THE PREFERRED EMBODIMENT

Referring to FIG. 1, shown is a virtual voiceprint repository 10 (VVR) connected to two separate applications. Banking Application 20 may be an over-the-phone application wherein a caller uses a telephone to connect to their bank and access their account to perform various banking tasks (for example, account transfers). For the purpose of this illustration, Banking Application 20 is an interactive voice response (IVR) application which enables the caller to perform these tasks using voice commands. Password Reset Application 30 may be an over-the-phone application wherein a caller uses a telephone to connect to their account (banking, trading, etc.) in order to enroll or change their personal password. This Application 30 is also an IVR application. For further purpose of illustration, Banking Application 20 employs a first proprietary speech engine and Password Reset Application 30 employs a second proprietary speech engine. It will be readily understood by those skilled in the art that any number of applications could be constructed and connected to an embodiment of the invention and that any number of speech engines, both proprietary and open-standard could be utilized.

Virtual Voiceprint Repository 10 comprises a storage system 40 and a voice print generator 50. In the depicted embodiment, voice print generator 50 comprises the portion of the system which collects the data from banking application 20 and password reset application 30 and uses this data to access the appropriate voice recordings from storage system 40. Generator 50 then uses this data to create the voiceprints requested by the respective applications 20 and 30. These voiceprints can then be used by the respective applications to authenticate the associated callers.

In operation, a user would call into banking application 20 using a telephone 5. Banking application 20 would present the caller with a series of menu options and, contemporaneous with this, attempt to authenticate the caller. In contrast to the prior art authentication systems, banking application 20 does not simply request a retrieval of a stored voiceprint for the caller. Rather, banking application 20 specifies a description of the data that should go into creating the caller's voiceprint on the fly, and further specifies the particular verification speech engine and associated parameters that should be utilized in creating this voiceprint. For example, application 20 could request that the voiceprint be created using a voice recording of the account number and birth date associated with the caller. Additionally, application 20 could request that two random digit strings be used, and that the voiceprint be created using the first proprietary speech engine.

These specifications are passed from banking application 20 to VVR 10. Voice print generator 50 then uses the relevant portions of these specifications to retrieve specific voice recordings from storage system 40. These voice recordings stored in storage system 40 are annotated with metadata, some of which corresponds to the specifications from application 20. These annotations can also include other metadata, such as transcription, semantic and other relevant information useful in discriminating between recordings. In this example, the specifications supplied by banking application 20 to VVR 10 included a request for the caller's birth date. One of the voice recordings stored in storage system 40 is annotated with metadata correlating to the caller's birth date. This particular birth date voice recording was collected and stored earlier, for example, during an enrollment process. The voice recording of the caller's birth date is retrieved from storage system 40 by voice print generator 50. This birth date recording is then processed by generator 50 using the first proprietary speech engine (also specified by banking application 20) to produce a voiceprint for this specific caller.

Now for the purposes of further illustration, consider the same caller calling from a different phone (e.g., a cell phone), telephone 7, into password reset application 30. Assume again, for the purposes of illustration, that application 30 requests that a voiceprint be created for this caller using a recording of the personal identification number and birth date associated with the caller. Additionally, application 30 requests that the voiceprint be created using the second proprietary speech engine.

Password reset application 30 passes these specifications on to VVR 10. Voice print generator 50 then uses the relevant portions of these specifications to retrieve specific voice recordings from storage system 40. As described above, these voice recordings stored in storage system 40 are annotated with metadata, some of which corresponds, in this instance, to the specifications from application 30. In this example, the specifications supplied by password reset application 30 to VVR 10 included a request for the caller's birth date. As we have seen from the above, one of the voice recordings stored in storage system 40 is annotated with metadata correlating to the caller's birth date. The voice recording of the caller's birth date is retrieved from storage system 40 by voice print generator 50. This birth date recording is then processed by generator 50 using the second proprietary speech engine (this time specified by password reset application 30) to produce a voiceprint for this specific caller.

Taken in conjunction, one can see that, although two distinct applications were accessed by the caller, and the applications provided distinct specifications to VVR 10, there was overlap in the requested metadata. In this instance, the overlap was a request by both application 20 and application 30 for a voiceprint constructed using, in part, the caller's birth date. Thus, even though the caller used two distinct applications which in turn utilize two distinct speech engines, the same voice recording could be used to create the voiceprints necessary for the respective applications.

Figure 2:
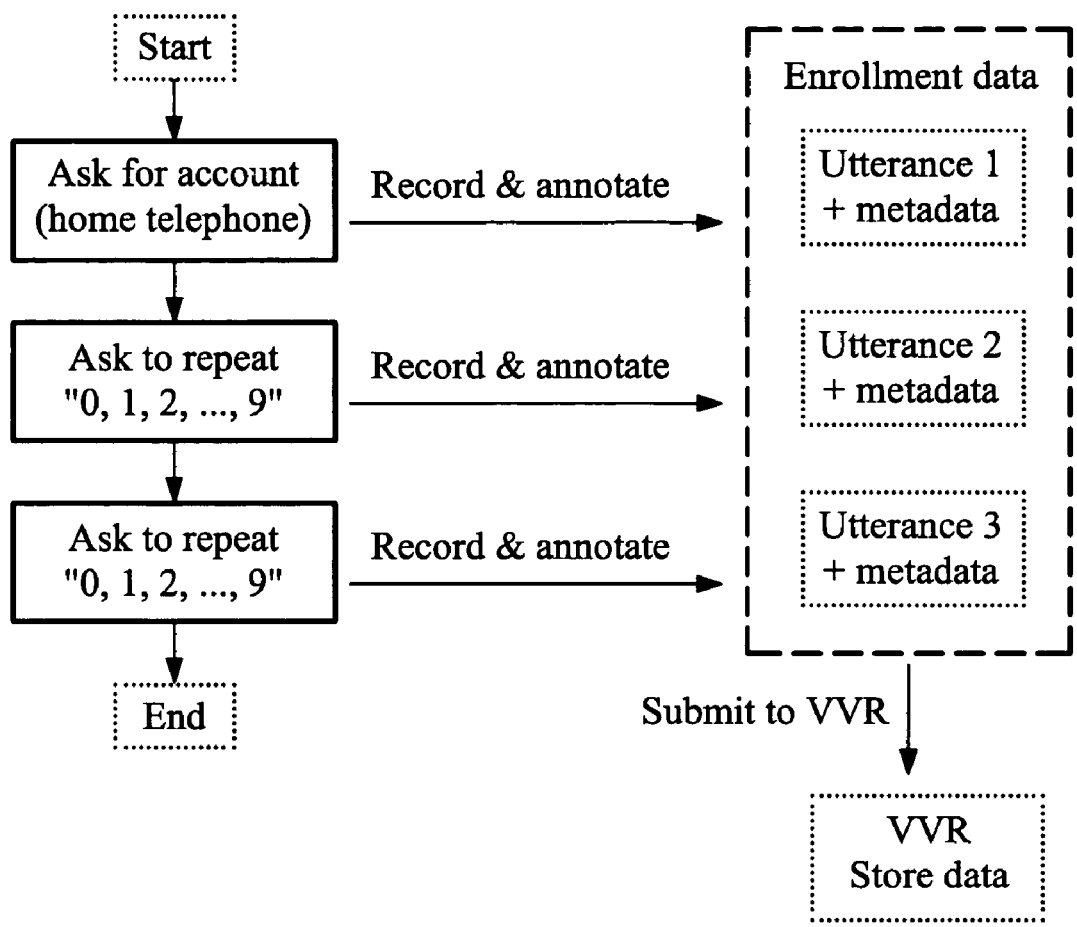
FIG. 2: shows a flow chart depicting an exemplary enrollment session using a system and method in accordance with an embodiment of the present invention.

Referring now to FIG. 2, shown is a typical enrollment dialog for a simple voice verification application. A user connects to the application via an input device (e.g., a telephone), and the application initiates an enrollment dialog which asks the caller to say a) their home phone number (which can be used as a personal identifier), and b) the digit string "0, 1, 2, . . . , 9," two times. These utterances (small instances of speech) are recorded and annotated with any information that the application has relating to the utterances (such as channel/gender detection results, recognition results and translation information). Once the annotated voice recordings are collected, they are submitted to the VVR. In the simplest case, the VVR simply stores the data in the storage system. However, as discussed below, the VVR may be programmed to manipulate the data in a number of ways prior to actual storage in the storage system.

The following XML code shows an example of the metadata that might be associated with the recording of "utterance 1":

```xml
<MetaData Id = "Utterance1">
    <!-- Recording date & time -->
    <Date> 12/1/2003 </Date>
    <Time> 13:47:23 </Time>
    <TimeZone> PST </TimeZone>
    <!-- Account number that data corresponds to -->
    <Account> 6505553021 </Account>
    <!-- Info about the utterance, collected by application -->
    <Gender> Male </Gender>
    <PhoneType> Electret </PhoneType>
    <Transcription> 6 5 0 5 5 5 3 0 2 1 </Transcription>
    <Interpretation> 6505553021 </Interpretation>
    <ANI> 6505553021 </ANI>
    <!-- Type of utterance -->
    <UttType> WorkPhone </UttType>
    <!-- Type of grammar that can interpret utterance -->
    <GrammarType> Digits10 </GrammarType>
    <!-- Application and engine use to collect data -->
    <ApplicationId> PasswordReset </ApplicationId>
    <ApplicationVersion> 1 </ApplicationVersion>
    <EngineId> FirstProprietarySpeechEngine </EngineId>
    <EngineVersion> 1 </EngineVersion>
    <!-- Information about specific instance of application -->
    <ProviderId> BankingApplication </ProviderId>
</MetaData>
```

As shown above, the metadata associated with a particular voice recording can comprise a wide range of information, including information relating to the gender of the speaker, the type of telephone used to provide the voice recording and the specific type and version of speech engine used by the application that collected the voice recording for storage and use by the VVR. The VVR can subsequently use all or portions of this metadata to access voice recordings and create voiceprints for applications that request voiceprints associated with all or portions of the metadata.

Figure 3:
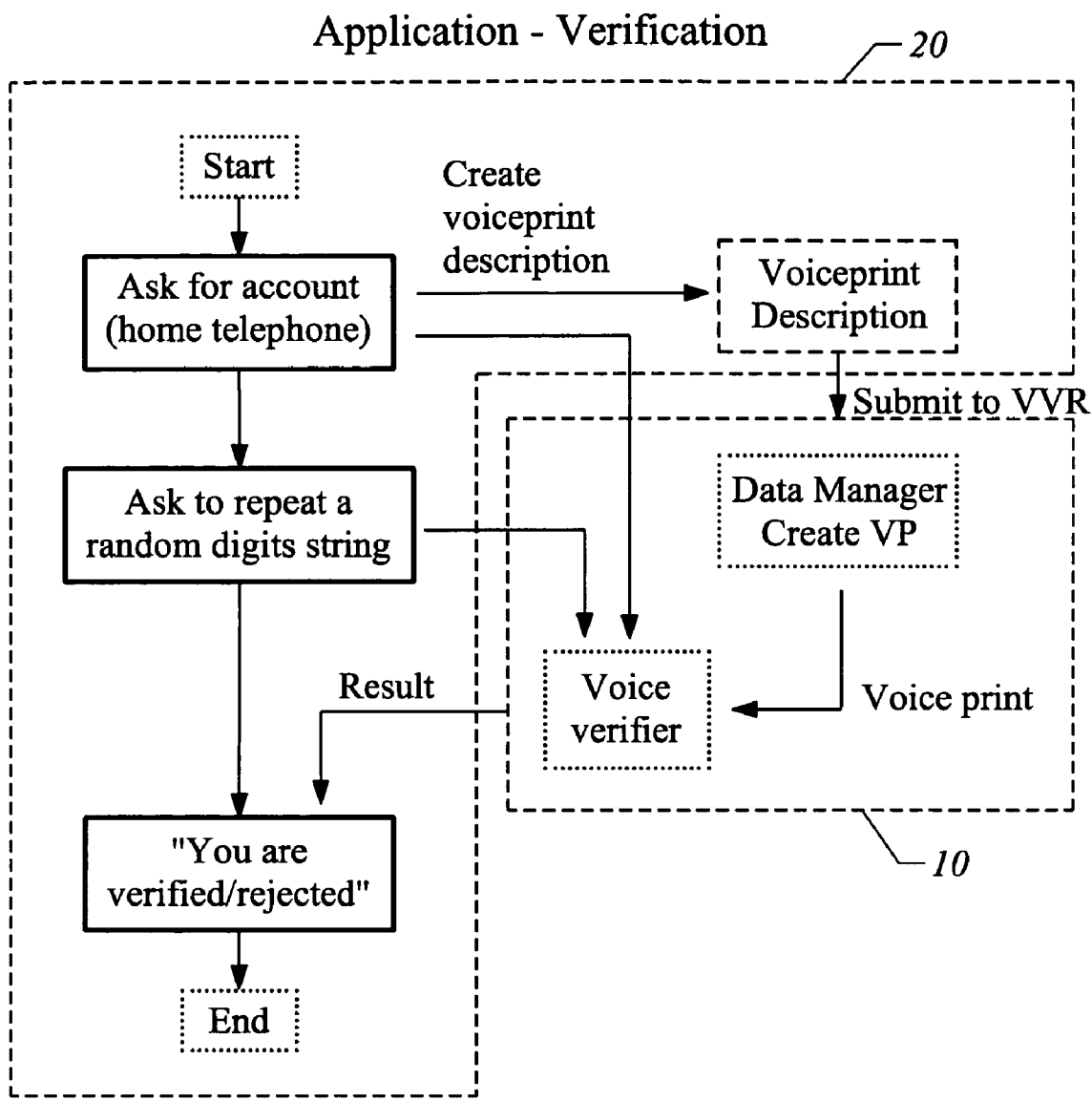
FIG. 3: shows a flow chart depicting an exemplary verification session using a system and method in accordance with an embodiment of the present invention.

Referring now to FIG. 3, shown is a typical verification dialog correlating to the enrollment dialog described above. A user connects to the application via an input device (e.g., a telephone), and the application asks the caller for their home phone number and asks the caller to repeat a random string of digits. The system uses the home phone number information to identify who it is the caller is claiming to be (a speech recognition engine is used to determine what number the caller is saying). Based upon all of this information, the application generates an "voiceprint description" (a description of the enrollment data that should be used to generate the voiceprint). In this instance, the voiceprint description includes information relating to the voice recordings to be retrieved (phone number and random digits) from the VVR storage system, and the type of speech engine being utilized by the application the caller is using. The voiceprint description is then submitted to the VVR, which returns a voiceprint that corresponds to the description. This voiceprint is then used by the application to authenticate the caller. The voiceprint description might look like this (again in XML format):

```xml
<VoicePrintDescription>
    <!-- Account number -->
    <Account> 6505553021 </Account>
    <!-- Info about engine that should be used to create vp -->
    <Engine>
        <!-- Identifier of the engine to use -->
        <Id> FirstProprietarySpeechEngine_v7_sp342140 </Id>
        <!-- Engine specific parameters -->
        <Parameters>
            <SVMasterPackage>
                English.America.digits.1
            </SVMasterPackage>
        </Parameters>
        <!-- Utterance one. Text-dependent verification data -->
        <Utt>
            <Interpretation>
                <Equal> 6505553021 </Equal>
            </Interpretation>
        </Utt>
        <!-- Utterance two. 0 through 9. Twice -->
        <Utt Count = "2">
            <GrammarType>
                <Equal> Digits0Through9 </Equal>
            </GrammarType>
        </Utt>
    </Engine>
</VoicePrintDescription>
```

Again, the above is illustrative of the various parameters that an application can specify with respect to requesting a particular voiceprint from the VVR. In this instance, the application asks for a voiceprint created using the caller's recorded telephone number and a random digit string. The application also specifies that the voiceprint should be created using a particular speech engine, the first proprietary speech engine, and a particular version of the speech engine, version 7. The VVR can then create the requested voiceprint and provide it to the application for use in the authentication process.

Although described above with reference to specific applications and as implemented in a specific embodiment, it will be obvious to those skilled in the art that a number of alternative design paths could be chosen, and a number of additional features may be presented. For example, suppose the VVR is unable to generate a voiceprint requested by a particular application based upon a particular specification because not all of the requested data are available. In this instance, the VVR could specify which of the requested data are missing in its response to the application. This information could in turn be used by the application to generate the missing information for future use (for example, by initiating an abbreviated enrollment session with the caller, and providing the collected voice recording and associated metadata to the VVR for storage).

For the purposes of generating better voiceprints (for example, compensating for a user's voice change over time), applications may be designed to submit all voice recordings to the VVR, regardless of whether or not the data were collected during an enrollment session or a successful authentication session. It could be up to the VVR to decide which voice recordings should be kept and which should be discarded as a matter of overall desired system functionality. Of course, the VVR could be designed such that this decision is influenced by the various applications when they specify which recordings they may need for future use. And, although it makes design sense to have the application annotate the voice recordings before they are released to the VVR (because the application has access to most of the context information), the VVR could perform a host of post-processing steps to fill in missing data.

One important note is that, although the detailed description above associates particular functionality to particular portions of the overall system, this is a design detail and not a design requirement. For example, the voiceprint generation portion of the VVR could actually be moved to the applications, relegating the VVR to essentially function as a "smart" voice recording repository (storing the annotated voice recordings). It may then still manage and select the appropriate data, but it would simply return the appropriate voice recordings to the application. In this manner, the VVR would not need to support multiple speech engine types and versions.

What is claimed is:

1. A system for generating voiceprints, comprising:
a first specification for designating a first set of data to be used in producing a first voiceprint;
stored voice recordings annotated with metadata describing characteristics associated with said stored voice recordings; and
a voice print generator for receiving said first specification and using said first set of data to retrieve selected voice recordings from said stored voice recordings, and further for generating said first voiceprint using said selected voice recordings;
wherein the first specification comprises a first voiceprint description received from a first application, the first voiceprint description identifying a first subset of said stored voice recordings to be utilized by the voice print generator to generate the first voiceprint; and
wherein the voice print generator is further operative to generate a second voiceprint responsive to a second specification comprising a second voiceprint description received from a second application different than the first application, the second voiceprint description identifying a second subset of said stored voice recordings, different than the first subset, to be utilized by the voice print generator to generate the second voiceprint;
the first and second voiceprints thereby being generated on demand by the voiceprint generator from the stored voice recordings responsive to the respective first and second voiceprint descriptions received from the respective first and second applications.

2. The system of claim 1, wherein said first specification includes a designation of the specific speech engine to be used in producing said first voiceprint, and further wherein said voice print generator creates said first voiceprint using said specific speech engine.

3. The system of claim 2, wherein said first specification is provided by the first application, said first application being coupled to said system, said first application requesting said first voiceprint.

4. The system of claim 3, wherein said first application collects current voice recordings from a first application user and annotates said current voice recordings with additional metadata, and further wherein said first application provides said current voice recordings and said additional metadata to said system for storage and subsequent use.

5. A system for generating on-demand voiceprints from stored voice recordings, comprising:
a data manager for receiving requests from a plurality of applications, wherein said applications provide said data manager with data specifications related to specific voiceprints requested by said applications;
a storage system for storing said voice recordings, wherein said voice recordings are annotated with metadata describing the characteristics of said voice recordings; and
a voice print generator for generating said specific voiceprints using said voice recordings;
wherein said data manager retrieves said voice recordings by correlating said data specifications with said metadata, and further wherein said data manager provides said voice print generator with additional information for use by said voice print generator in producing said voiceprints;
wherein a first specification comprises a first voiceprint description received from a first application, the first voiceprint description identifying a first subset of said stored voice recordings to be utilized by the voice print generator to generate a first voiceprint; and
wherein the voice print generator is further operative to generate a second voiceprint responsive to a second specification comprising a second voiceprint description received from a second application different than the first application, the second voiceprint description identifying a second subset of said stored voice recordings, different than the first subset, to be utilized by the voice print generator to generate the second voiceprint;
the first and second voiceprints thereby being generated on demand by the voiceprint generator from the stored voice recordings responsive to the respective first and second voiceprint descriptions received from the respective first and second applications.

6. The system of claim 5 wherein said additional information includes a specification of the particular speech engine to be used by said voice print generator in producing said voiceprints.

7. The system of claim 5 wherein said data manager is operative to receive additional voice recordings from said applications for storage in said storage system.

8. The system of claim 7 wherein said additional voice recordings are annotated by said applications with additional metadata describing the characteristics of said additional voice recordings.

9. The system of claim 7 wherein said additional voice recordings are annotated by said data manager with additional metadata describing the characteristics of said additional voice recordings.

10. A method for generating on-demand voiceprints, comprising the steps of:
receiving a first specification from a first application describing data necessary to generate a first voiceprint;
retrieving voice recordings from a storage system by correlating said data with metadata associated with said voice recordings in said storage system;
processing said voice recordings in accordance with said specification and generating said first voiceprint using said stored voice recordings; and
providing said first voiceprint to said first application;
wherein the first specification comprises a first voiceprint description received from the first application, the first voiceprint description identifying a first subset of said stored voice recordings to be utilized by a voice print generator to generate the first voiceprint; and
wherein the voice print generator is further operative to generate a second voiceprint responsive to a second specification comprising a second voiceprint description received from a second application different than the first application, the second voiceprint description identifying a second subset of said stored voice recordings, different than the first subset, to be utilized by the voice print generator to generate the second voiceprint;
the first and second voiceprints thereby being generated on demand by the voiceprint generator from the stored voice recordings responsive to the respective first and second voiceprint descriptions received from the respective first and second applications.

11. The method of claim 10, wherein said first specification identifies a specific speech engine for use in creating said first voiceprint.

12. The method of claim 11, wherein said first application utilizes said first voiceprint to authenticate a user.

13. The method of claim 10, wherein said first application collects current voice recordings from said user and annotates said current voice recordings with additional metadata, and further wherein said first application provides said current voice recordings and said additional metadata to said storage system for storage and subsequent use.

* * * * *